Oct. 30, 1951  J. W. DEARBORN  2,573,410
WORK-HOLDING FIXTURE
Filed May 1, 1946  5 Sheets—Sheet 5
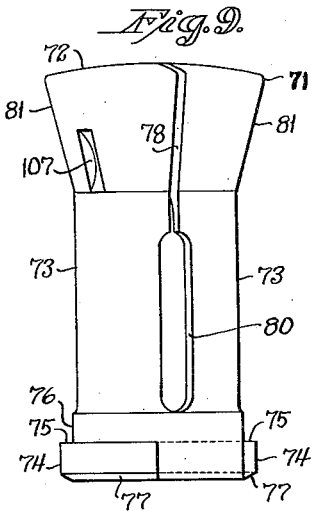
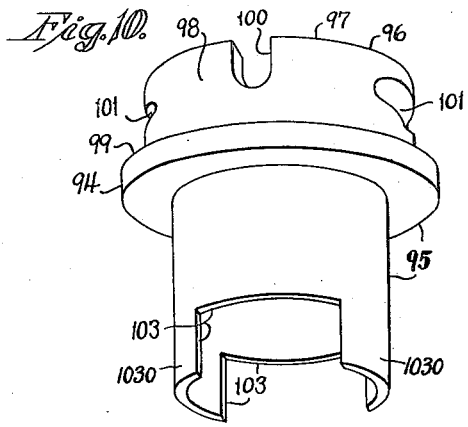
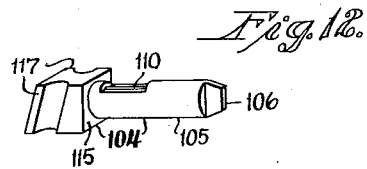
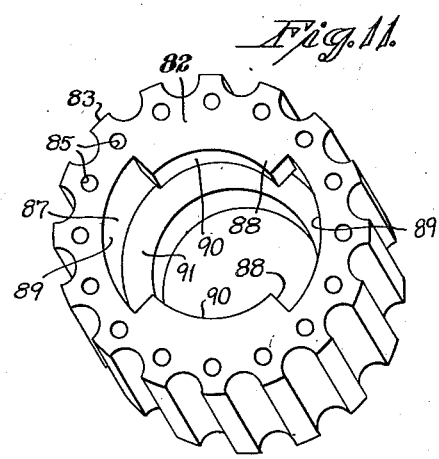
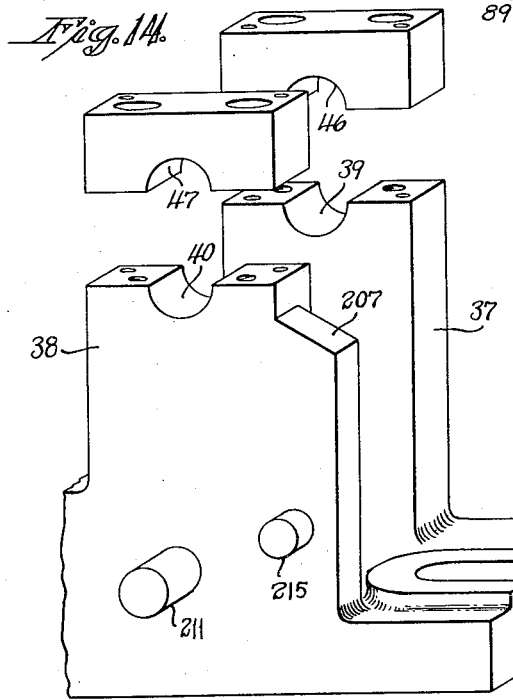
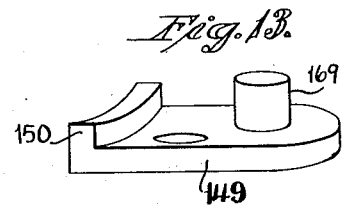
Inventor
John W. Dearborn
By Seymour, Earle & Nichols
Attorneys Patented Oct. 30, 1951

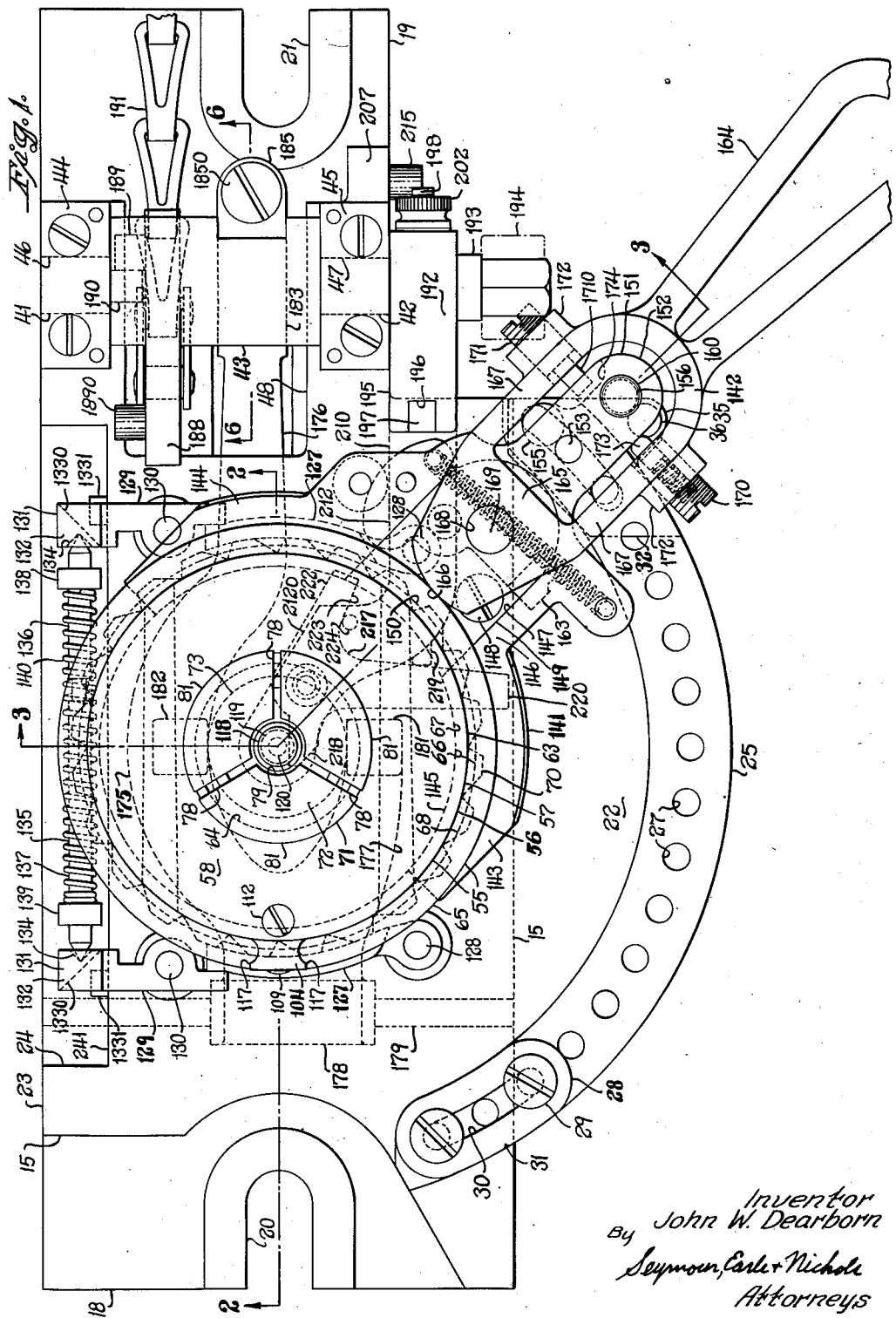

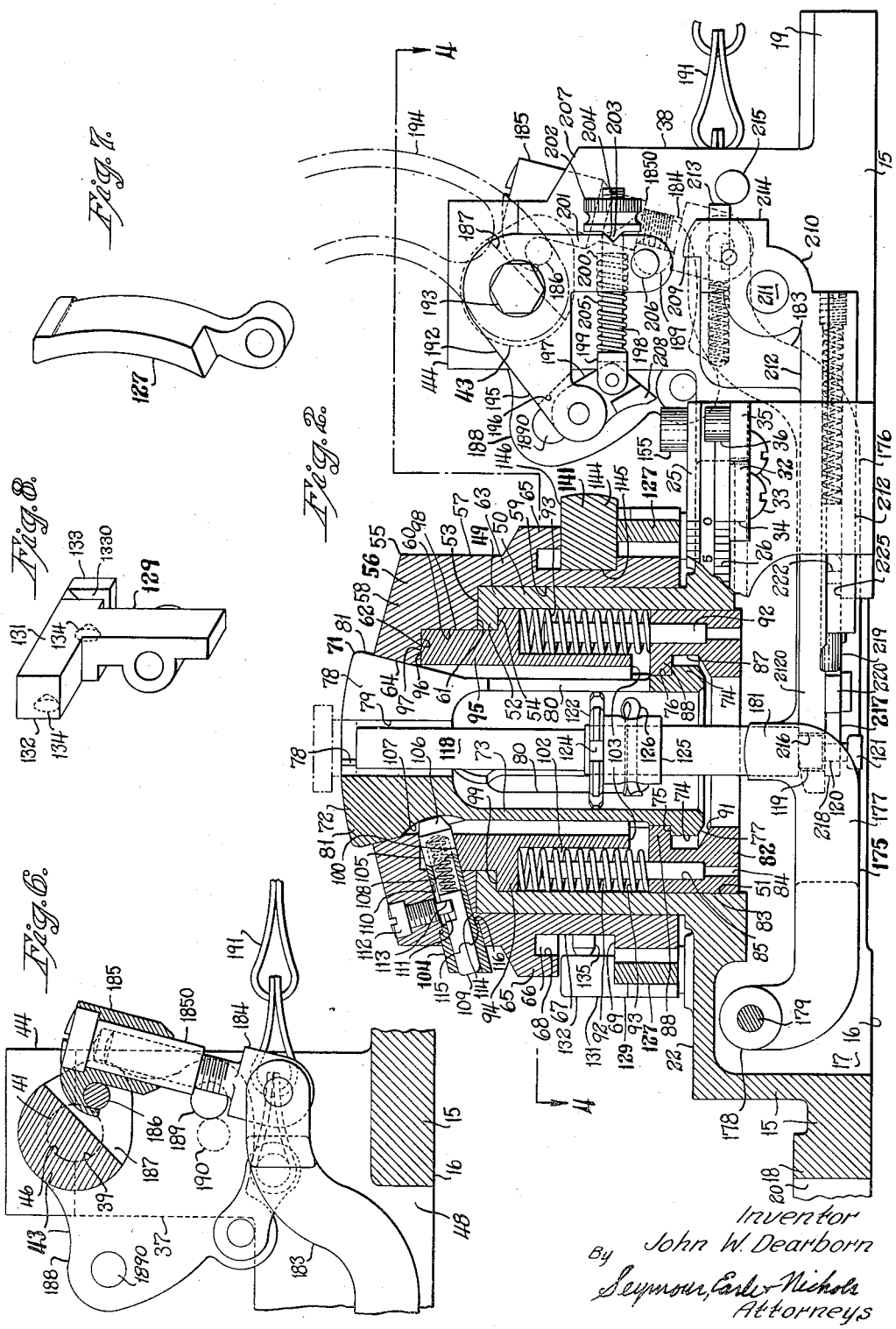

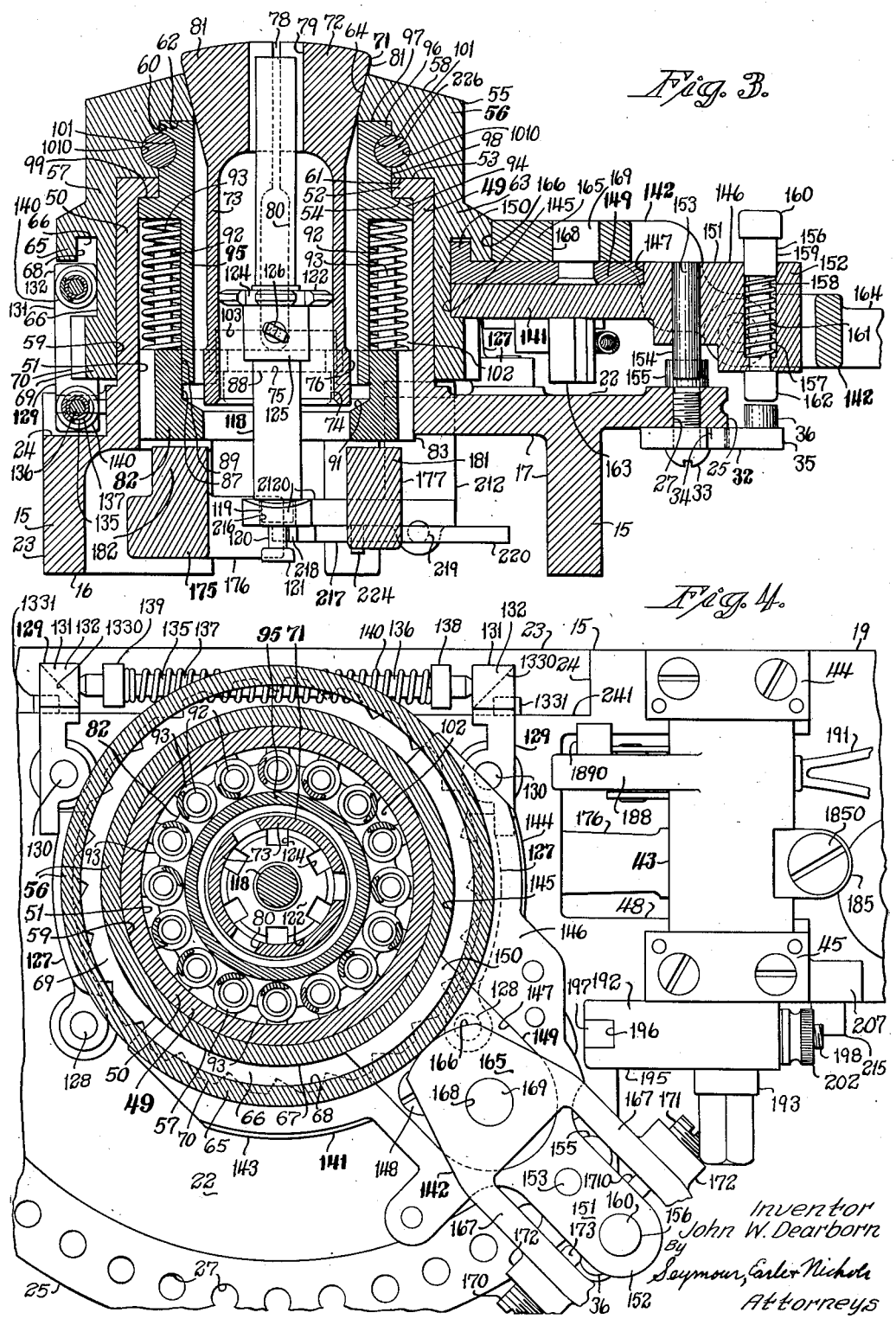

2,573,410

UNITED STATES PATENT OFFICE 2,573,410

WORK-HOLDING FIXTURE

John W. Dearborn, Ansonia, Conn.

Application May 1, 1946, Serial No. 666,320

8 Claims. (Cl. 90—57)

The present invention relates in general to work-piece holding-fixtures and in particular to that type of fixture adapted for holding work-pieces such, for instance, as solid or tubular rods, screws, rivets, bolts, etc., during the operations of milling, drilling, sawing and machining.

An object of the invention is to provide a superior work-piece holding-fixture which will firmly grip the work-piece to be operated upon and which is provided with improved means for ejecting the work-piece when the operation being performed thereon is completed.

A further object of this invention is to provide a work-piece holding-fixture constructed and arranged to firmly hold a work-piece to be operated upon and having incorporated therein improved means for effecting the automatic release and ejection of the work-piece upon the completion of the operation thereon.

A still further object is to provide a superior work-holding fixture having improved indexing-means incorporated therein whereby the positioning of a work-piece held by the fixture may be accurately accomplished by reference to an indexing-scale, and means whereby the work-piece may be either automatically or manually released and ejected from the fixture.

A still further object of the present invention is to provide a work-piece holding-fixture having improved means for releasably securing a removable chuck therein and means for permitting the ready removal of the chuck from the work-holding fixture for replacement by a chuck of different size.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 1 is a plan view of the improved work-piece holding-fixture of this invention, a part of the handle of which is broken away;

Fig. 2 is a side elevation of the said fixture partly in section on line 2—2 of Fig. 1;

Fig. 3 is a transverse sectional view on line 3—3 of Fig. 1 with some of the parts in elevation;

Fig. 4 is a broken sectional view in the plane of line 4—4 of Fig. 2;

Fig. 6 is a fragmentary sectional elevation of the right-hand end of the fixture on line 6—6 of Fig. 1;

Fig. 7 is a perspective view of one of the brake-shoes of the indexing-head;

Fig. 8 is a perspective view of one of the brake-spring supporting-posts;

Fig. 9 is an elevation of the work-piece holding-chuck;

Fig. 10 is a perspective view of the spring-retaining bushing;

Fig. 11 is a perspective view of the chuck-coupling ring;

Fig. 12 is a perspective view of the chuck-locking key;

Fig. 13 is a perspective view of the yoke-retaining tongue; and

Fig. 14 is a perspective exploded view of a fragmentary portion of the right-hand end of the fixture showing the bearing-supports for the crank-beam.

Figure 5:
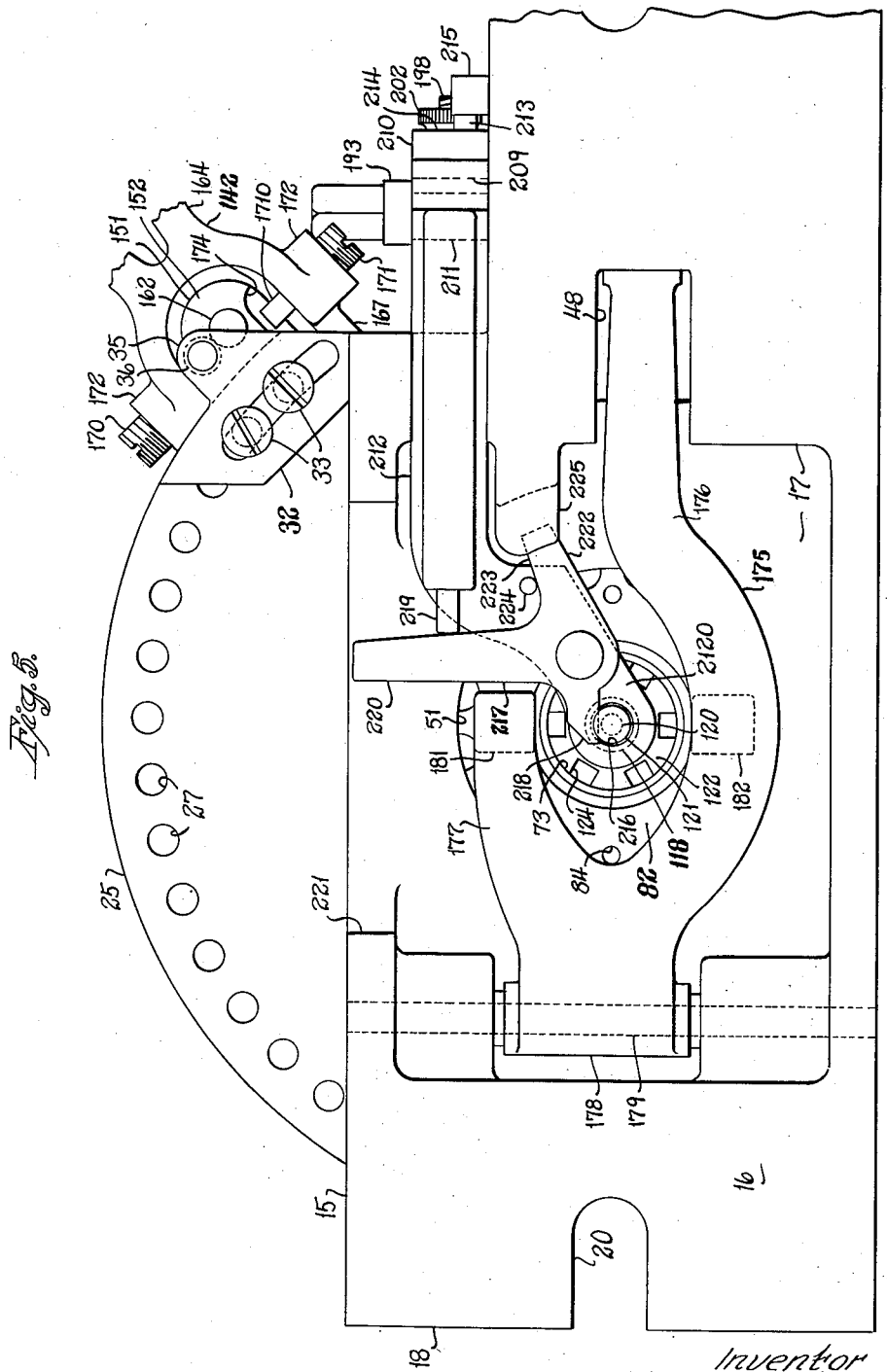
Fig. 5 is a broken plan view of the underside of the fixture.

The fixture of this invention is designed to securely hold a work-piece so that the latter may be machined as, for example, by milling, drilling, sawing, and similar operations, and, in particular, operations which necessitate indexing a work-piece about its longitudinal axis through equal arcs of rotation. A characterizing feature of the improved fixture and one which greatly enhances its usefulness over the more commonly-used ratchet-type of fixture, is its indexing-means which enables an operator to index the work-piece through equal arcs of rotation varying from as little as a fraction of one degree to as high as 180°.

General description

In general, the fixture comprises a work-piece indexing-head rotatably mounted on a fixed base and having a central tapered aperture in which is mounted a chuck adapted to receive a work-piece. The work-piece is securely held in the chuck-jaws by the force of a plurality of coil compression-springs which are mounted circumferentially within the indexing-head and act on the lower end of the chuck to draw the latter down tightly into the tapered aperture of the head and contract the resilient jaws. Suitable means are provided for lifting the chuck in the aperture of the indexing-head, against the resistance of the coil compression-springs so as to enable the chuck-jaws to spread apart and release the work-piece, whereupon an automatic ejector may be actuated to positively eject the work-piece from the chuck-jaws. Mounted on the base are brake-shoes which are arranged to continuously engage the lower end of the indexing-head, the brake-shoes being spring-loaded so as to strongly resist its rotation. The indexing-head is adapted to be rotated by a manually-operated handle which is carried by the head and which embodies a cam arranged to frictionally engage the indexing-head at any point thereon, so as to effect rotation of the head through an angle corresponding to the angle of rotation of the handle. The desired angle of rotation is measured by a suitable scale provided on the base; and adjustable stops which may be set at any predetermined points on the scale over an arc of 90° in increments of as little as one degree to limit the throw of the operating-arm to a predetermined point of the scale. Thus, by setting a stop at 72°, a work-piece would be rotated four successive times before completing one revolution of the indexing-head, thus permitting the machining of a five-sided work-piece. If the stop is set at 36°, for example, then a work-piece having ten sides would be formed; or if one stop was set at 90° and a second stop at 30°, then a work-piece could be indexed through 120° to form three individual faces or cuts.

An automatic ejector is used in most instances when the work-piece is relatively short, although there may be instances when the automatic ejection of a short work-piece is undesirable, as in the case of relatively-delicate or precision-built parts which, if ejected into a receptacle or onto the floor, would be damaged. Further, in instances where it is desired to machine a relatively-long work-piece, the use of the ejector must be dispensed with in order to make room for the longer work-piece. Accordingly, the ejector is supported within the chuck in a manner to enable the ejector to be readily removed therefrom, in which event the machined work-piece is removed from the chuck by hand.

*Frame structure*

Referring to the drawings, the work-piece holding-fixture of this invention is adapted to be mounted on the bed of a machine such as, for example, a milling machine, and to this end comprises a base 15 which, in the present embodiment, is a relatively-heavy substantially-rectangular metal plate having on its underside 16 a substantially-rectangular recess 17; and at its opposite ends feet 18 and 19 respectively. As shown in Fig. 1 each foot 18 and 19 is provided with a substantially-rectangular slot 20 and 21 respectively intersecting at its outer end the adjacent edge of the corresponding foot, the slots 20 and 21 being adapted to receive bolts for temporarily fastening the fixture to the bed of a machine. Formed integrally with the base 15 and elevated above the horizontal plane of the feet 18 and 19 is a substantially-flat table portion 22 the inner edge 23 of which is intersected by a notch 24 the longitudinal axis of which is parallel to the edge 23. The opposite or outer edge 25 of the table 22 is substantially semicircular in shape and overhangs the corresponding edge of the base. The periphery of the semicircular edge 25 is provided with a scale 26 measuring from 0 to 90° in increments of 1°. Formed in the outer edge 25 of the table and back from the perimeter thereof are a plurality of substantially-equally-spaced internally-threaded apertures 27 arranged in the arc of a circle concentric with the semicircular edge 25. An adjustable stop-member 28 is mounted on the top of the table adjacent the periphery thereof and is adapted to be secured thereto by suitable fastening-means 29 which extend through the stop-member 28 at opposite ends of a longitudinal slot 30 therein, and are threadedly secured in corresponding apertures 27 of the table. The stop-member 28 is thus adapted to be adjustably secured at any predetermined position with respect to the scale 26, and to this end is provided with an index mark 31 on its outer edge for locating the stop 28 at a particular point with respect to the scale. A second stop 32 is adapted to be adjustably secured, in a similar manner, by fastening-means 33 to the outer edge 25 of the table but on the underside thereof, and is provided with an index mark 34 which is normally set opposite the zero mark of the scale 26. The second stop 32 is provided with an outwardly-projecting ear 35 on which a stop-lug 36 is secured, the latter projecting upwardly substantially vertically from the upper face of the ear 35.

Referring to Figs. 1, 2 and 6 of the drawings, formed integrally at the right-hand end of the base 15 and projecting upwardly substantially vertically from the foot-portion 19 thereof are a pair of posts 37 and 38 respectively spaced transversely across the end of the base, the distance between the respective posts being substantially equal to the width of the foot 19 less twice the thickness of each post. Each post is of substantially-rectangular cross section and is provided with a semicylindrical recess 39 and 40 respectively, in its top-edge the longitudinal axes of the recesses 39 and 40 being in alignment and substantially at right angles to the longitudinal axis of the base. Each semicylindrical recess is adapted thus to form one-half of a cylindrical bearing-aperture for the trunnions 41 and 42 of a crank-beam 43 which is adapted to actuate the chuck and ejector elements of the fixture, as hereinafter described. The upper half of each bearing-aperture 39 and 40 respectively is completed by suitable blocks 44 and 45 which are secured by screws or other fastening-means to the tops of the posts 37 and 38 respectively, each block being provided with semicylindrical recesses 46 and 47 in their bottom edges adapted to complement the semicylindrical recesses 39 and 40 of the respective posts 37 and 38. An elongated aperture 48 is provided in the base 15 between the posts 37 and 38 and intersects the recess 17 in the underside of the base.

Referring to Figs. 2 and 3, on the top of the table 22 and intermediate the opposite ends 18 and 19 thereof is a hollow cylindrical column 49 integral at its base with the table-top. The vertical walls 50 of the column are of substantially uniform thickness, the inner wall 51 of the column intersecting at its lower end, the recess 17 in the underside of the base 15. The upper end of the column is provided with an integral relatively-narrow annular flange 52 which extends inwardly radially at substantially right angles to the vertical wall of the column and is rectangular in cross section, its top annular surface 53 constituting a smooth flat bearing-surface for the purpose hereinafter described. The underside of the flange 52 constitutes an annular shoulder 54.

*Chuck and indexing-head assembly*

The assembly comprising the chuck and chuck indexing-head is indicated generally at 55 and is adapted to be rotatably mounted on the bearing-surface 53 of the column 49. The indexing-head 56 comprises an inverted cup-shaped member having substantially-cylindrical side walls 57, and a convex top-surface 58. The inner walls of the indexing-head 56 are formed by two concentric bores of progressively smaller diameter which provide concentric cylindrical surfaces 59 and 60, each having a substantially-square annular shoulder 61 and 62 respectively at its upper end. The cylindrical wall 59 is more than twice the length of the cylindrical surface 60 and corresponds substantially in length to that of the wall 50 of the column 49, the wall 59 being hereinafter referred to as the skirt of the indexing-head. The annular shoulder 61 is equal in width to the bearing-surface 53 of the flange 52 and is adapted to seat thereon, the cylindrical wall 59 being of a diameter to make smooth rotating engagement with the outer cylindrical surface of the wall 50 of the column 49. The top of the indexing-head is relatively thick and is provided with a central aperture 64, the annular walls of which are tapered downwardly-and-inwardly. On the outer wall 63 of the indexing-head and adjacent the upper end of the skirt-portion, is an integral annular flange 65 of substantially-rectangular cross section depending downwardly in spaced parallel relationship with respect to the vertical wall of the indexing-head so as to provide an annular recess 66, also substantially rectangular in cross section, between the outer cylindrical surface 67 of the skirt and the inner cylindrical surface 68 of the flange 65, for the purpose hereinafter described. At the lower end of the skirt 59 is an integral relatively-thick radially-projecting annular flange 69 of substantially-rectangular cross section and provided around its periphery with a plurality of ratchet-teeth 70.

Mounted in the tapered central aperture 64 of the indexing-head 56 is a chuck 71 which comprises a hollow tubular-member of a suitable resilient material, such as spring steel, having a relatively-thick frusto-conical head-portion 72 at its upper end and relatively-thin cylindrical side walls 73. Referring to Figs. 2, 4 and 9, the lower end of the chuck is provided with a cylindrical bearing-surface 76 and two diametrically-opposite curvilinear locking-lugs 74 formed integral therewith. Each lug is provided with a square shoulder 75. The lower arcuate edge of each locking-lug 74, is provided with an annular upwardly-and-outwardly sloping bevel 77. Three relatively-narrow longitudinal slots 78 are provided in the chuck in circumferential and equally spaced relationship, each slot cutting radially through the head 72 of the chuck to the central aperture 79 thereof, and extending downwardly parallel to the longitudinal axis of the chuck through the relatively-thin walls 73 thereof to a point adjacent the upper edge of the cylindrical bearing-surface 76. The portion of each slot 78, from a point immediately below the head of the chuck to the lower end of the slot, is relatively wide as shown at 80. The opposite ends of each widened portion 80 of the slots is terminated by a suitable radius. The three longitudinal slots 78 thus divide the tubular chuck into three resilient sectors, the upper ends of which, corresponding to the frusto-conical head-portion 72 of the chuck, constitute three chuck-jaws 81 which are adapted to grip a work-piece, as hereinafter described.

The outer periphery of the frusto-conical head 72 of the chuck comprises a tapered surface, the angle of the taper corresponding substantially to that of the tapered aperture 64 in the indexing-head 56, and hence it will be manifest that if the chuck 71 is drawn downwardly into the aperture 64, the three respective jaws 81 will be forced together thereby gripping a work-piece mounted in the axial aperture 79 of the chuck; and that if the chuck is raised up out of the tapered aperture 64 of the indexing-head 56, the respective chuck-jaws 81 will be free to spring apart and will spring apart, due to their own resiliency, to release the work-piece.

In the present embodiment, the chuck 71 is adapted normally to be drawn down and held in the aperture 64 of the indexing-head 56, and to this end a chuck-coupling ring-member 82 is provided which, as shown in Figs. 2, 3 and 11, comprises a cylindrical annulus, the periphery of which is provided with a plurality of longitudinal substantially-vertical serrations 83 which are arranged to make a smooth sliding fit with the inner wall 51 of the column 49. Equally spaced, circumferentially, around the annulus or ring-member 82 on a circle intermediate the inner and outer peripheries thereof, are a plurality of vertical apertures 84 the longitudinal axes of which extend through the wall of the annulus substantially parallel to the longitudinal axis thereof. Each aperture 84 is provided with a counterbore 85. The inner wall of the ring-member 82 is provided with a counterbore 87 having at its upper edge and at diametrically opposite points thereon, integral inwardly-projecting locking-lugs 88. Each locking-lug 88 is substantially square in cross section and corresponds in thickness to the vertical height of the bearing-surface 76 of the chuck 71. Between each lug 88 of the ring-member is an arcuate relief-recess 89, as clearly shown in Fig. 11. The distance measured between the inner curved surfaces 90 of the respective lugs 88, is equal to the diameter of the annular bearing-surface 76, whereby the lugs are adapted to make smooth sliding engagement therewith. The bottom of the counterbore 87 comprises an inwardly-and-downwardly-beveled surface 91 which is spaced vertically below the locking-lugs 88 sufficiently to enable the locking-lugs 74 of the chuck to engage their shoulders 75 with the underside of the respective locking-lugs 88. The beveled surfaces 77 of the lugs 74 are disposed adjacent the correspondingly-beveled surface 91 of the counterbore.

Mounted in each one of the counterbored apertures 85 of the ring-member 82 is a pin 92 which constitutes a spring-pilot for supporting a coil compression-spring 93, the lower end of each spring 93 being adapted to seat on the top surface of the annular ring-member 82. The upper ends of the springs 93 are adapted to abut against the under face of an annular flange 94 which is substantially equal in width to the major diameter of one of the springs 93 and is formed integrally with and adjacent the upper end of a spring-retaining bushing 95. Referring to Figs. 2 and 10, the upper end or rim 96 of the bushing 95 comprises a cylindrical portion having a square end constituting a bearing-surface 97; and an outer side wall 98 at the base of which is an annular shoulder 99 constituting the upper face of the annular flange 94. The external diameter of the wall 98 and that of the annular flange 94 of the spring-bushing 95 are equal respectively to the diameter of the iinner cylindrical wall 60 of the indexing-head 56 and the diameter of the inner cylindrical wall 51 of the column 49. The spring-bushing 95 is positively fastened in closely adjusted, assembled position within the indexing-head 56 and column 49, by a pair of transverse-pins 226, as hereinafter described, so that the flat bearing-surface 97 and the annular shoulder 99 of the bushing 95 make smooth sliding engagement with the shoulder 62 of the indexing-head and the underside of the annular flange 52 of the column 49 respectively. As shown in Fig. 10, a slot 100 intersects the upper edge of the rim 96 of the bushing for the purpose hereinafter described. At diametrically-opposite points in the side wall 98 are a pair of shallow semicylindrical grooves 101, the longitudinal axis of each groove being substantially at right angles to the longitudinal axis of the bushing. These grooves are adapted to receive a pair of keys or pins 226 which lock the indexing-head to the upper end of the spring-bushing, as mentioned above, and prevent rotation of the bushing with respect to the indexing-head.

The lower end of the spring-bushing 95 extends downwardly to within a predetermined distance from the annular beveled surface 91, while the outer periphery of the lower end of the bushing is spaced from the inner wall 51 of the column so as to form an annular passage 102 for the springs 93. The diameter of the axial bore of the bushing 95 is substantially equal to the distance between the outer surfaces of the diametrically-opposite locking-lugs 74 of the chuck to enable the latter to be dropped down into the bushing from the upper end thereof. The lower end of the bushing 95 is provided with two substantially-rectangular recesses 103 each intersecting the lower edge of the bushing at substantially-diametrically opposite points thereof.

The two diametrically-opposite arcuate tongues 1030 formed at the lower end of the bushing 95 by the recesses 103 are adapted to fit in the corresponding relief-recesses 89 of the coupling-member 82 and to abut at their opposite edges the corresponding ends of the locking-lugs 88 thereof to lock the spring-bushing and coupling-member from rotating relative to each other. The chuck 71 is adapted to be releasably keyed to the indexing-head by a spring-loaded key 104 which, as shown in Figs. 2 and 12, comprises a tubular member 105 having a relatively-thin vertically-disposed tongue 106 at its forward end which is adapted to engage in a longitudinal keyway 107 in the head of the chuck. Within the tubular member 105 is a coil compression-spring 108 which is adapted to bear at its rear end against the forward end of a pin 109 mounted in the rear end of the tubular member 105, the forward end of the spring 108 abutting the end wall of the latter. A longitudinal slot 110 is formed in the upper side of the tubular member 105 to receive the lower reduced end 111 of a screw 112 which is threadedly secured in an aperture in the top of the indexing-head. The reduced end 111 of the screw is adapted to engage the shoulder 113 of a recess in the pin 109 to retain the latter in the tubular member. The tubular member 105 is mounted in a radially-disposed aperture 114 in the indexing-head and in the slot 100 in the rim of the bushing, the aperture 114 and the slot 100 being in alignment. A shoulder 115 is provided at the rear end of the tubular member 105 to engage a counterbored shoulder 116 of the aperture 114 so as to limit the inward movement of the spring-loaded key 104. Suitable finger-grips 117 are provided at the rear end of the latter to manually retract the key from the keyway 107 of the chuck.

The work-piece ejector is indicated at 118 and comprises a pin mounted freely in the central aperture 79 of the chuck and extending from a point adjacent the upper end thereof downwardly into the recess 17 in the underside of the base 15, the lower end of the pin having a reduced collar portion 119 and a depending stem-portion 120 provided at its extremity with a head 121. The ejector-pin 118 is supported axially in the aperture of the chuck by means of a guide-ring 122 which comprises a disk-shaped member having radial slots 124 in a periphery and an integral sleeve-portion 125. The sleeve-and-ring assembly is adapted to be slipped onto the ejector-pin 118 and moved down to a position thereon substantially intermediate its ends. Fastening-means such as a cotter-pin 126 may be used to secure the guide-ring 122 to the ejector-pin.

Secured to the top or table 22 of the base 15 and at diametrically-opposite sides of the indexing-head 56 are a pair of brake-shoes 127 (see Figs. 1, 2, 4 and 7) comprising a longitudinally curved member substantially rectangular in cross section and pivoted at one end by a pin 128 to the top of the table, the inner curved surface of each brake-shoe conforming in curvature, and being adapted to frictionally engage the ratchet-teeth 70 of the indexing-head. The outer or free end of each brake-shoe extends toward the inner edge 23 of the base 15 and is adapted to be engaged by one end of a spring-loaded lever-arm 129 (see Fig. 8) which, in turn, is pivotally mounted by a pin 130 intermediate its opposite ends to the top of the base 15. The end of each lever-arm 129 adjacent the inner edge of the base, is provided with a substantially-vertical post 131 comprising an upper and lower reach 132 and 133 respectively, the latter being adapted to extend down into the relief-recess 24 in the edge 23 of the base. An oblique slot 1330 is provided in the outer face of each of the lower reaches of the vertical posts and is adapted to accommodate the outwardly-projecting head of a guide-pin 1331 secured in the substantially vertical wall 241 of the longitudinal recess 24.

Each post has in its upper and lower reach a countersunk recess 134 respectively adapted to receive the tapered end of a spring-pilot member 135. Each one of the pair of spring-pilot members 135 comprises a rod 136 and a sleeve 137 telescoping thereover, both the rod 136 and sleeve 137 having an annular shoulder 138 and 139 respectively, between which is arranged a coil compression-spring 140, the latter being adapted to abut at its opposite ends against the respective shoulders 138 and 139 of the sleeves of the spring-pilot members, so as to hold the tapered ends thereof in the oppositely-disposed recesses 134 of the respective posts. The combined force of these two compression-springs 140 acting on the inner ends of the respective lever-arms 129, tends to pivot the outer ends thereof inwardly in firm engagement with the corresponding ends of the brake-shoes 127 and thereby to hold the latter continuously in engagement with the ratchet-teeth 70 of the indexing-head. The latter is, as a consequence, strongly held against any rotation whatsoever, other than that positively accomplished by the manually-operated indexing-means hereinafter described.

The device for manually indexing the chuck and indexing-head assembly comprises a yoke-member indicated generally at 141 and an operating-handle indicated generally at 142, the latter being adapted to be pivotally secured to the yoke-member, as hereinafter described. The yoke-member 141 comprises a substantially-flat relatively-thick plate-member having outwardly-diverging arms 143 and 144 at its inner end. The arms are curvilinear and the inner faces thereof cooperate to form a semicircular bearing-surface 145 substantially equal in diameter to the diameter of the outer surface 67 of the skirt-portion of the indexing-head, the curvilinear bearing-surface 145 being adapted thus to make a smooth rotating fit with the outer surface 67 of the skirt. The portion of the yoke-member adjacent the root of each arm comprises a relatively-wide, substantially-flat section 146 which is provided with a shallow rectangular recess 147, the longitudinal axis of which is coincident with the longitudinal axis of the yoke-member. The outer end of the recess 147 intersects the curvilinear bearing-surface 145, while the opposite end of the recess has a substantially-semicircular end wall. Secured within the recess 147 by fastening-means 148, is a tongue-shaped member 149 adapted to seat snugly in the recess 147 flush with the upper surface of the flat 146. The outer end of the tongue-member 149 (see Fig. 13) is provided with an upstanding curvilinear key 150 which, as shown in Figs. 3 and 4, is substantially rectangular in cross section and dimensioned to project upwardly into and make a nice fit in the annular recess 66 between the downwardly-extending annular flange 65 of the indexing-head and the outer surface 67 thereof. When assembled in the yoke-member 141, the tongue 149 thus serves to hold the curvilinear bearing-surface 145 of the yoke in engagement with the outer surface 67 of the indexing-head so as to permit the yoke 141 to be swung about the vertical axis of the head. As shown in Fig. 2, the thickness of the respective arms 143 and 144 of the yoke is such that the upper and lower surfaces thereof make a close sliding fit between the lower edge of the downwardly-depending flange 65 of the indexing-head and the annular upper surface of the ratchet-tooth flange 69. Thus, the yoke-member 141 is securely held in operating contact with the indexing-head.

The outer end of the yoke-member is reduced in cross section to afford an arm 151 which is thickened on its underside adjacent its outer extremity to provide a relatively-solid block-portion 152.

As shown in Fig. 3, a pair of pins are mounted in the block 152 in tandem and on the longitudinal axis thereof the innermost pin 153 being fixed and extending vertically below the underside of the arm 151. The depending end 154 of the pin 153 is adapted to bring up against a fixed post 155 on the table 22 adjacent the zero mark of the scale which limits the throw of the arm 151 in a counterclockwise direction; and to bring up against the adjustable stop 28 at the other end of the scale, so as to limit the throw of the arm in the clockwise direction. The second pin 156 is mounted in a substantially-vertical counterbored aperture 157 in the block 152 and comprises a shank 158 at the upper end of which is an enlargement 159 adapted to make a smooth sliding fit in the counterbore of the aperture, the enlargement being provided with a head 160 at its upper end. A coil-spring 161 is mounted in the counterbore between the bottom thereof and the enlargement 159 of the shank 158. The lower extremity of the shank extends downwardly below the underside of the block 152 and is provided with a collet 162 secured to the shank by a force fit or equivalent fastening-means. It will be clear that by pushing down on the head 160, the collet 162 will be displaced downwardly into juxtaposition to the stop-lug 36 on the ear 35 of the adjustable stop-member 32, so as to limit the throw of the arm 151. Normally, however, the spring 161 holds the collet 162 upwardly out of the path of the lug 36, so as to permit the arm 151 to swing freely thereby.

The second adjustable stop 32 is provided for use when it is desired, to index a work-piece through angles both less than and greater than 90°. Thus, in the latter instance if the angle of throw is to be 131°, the first stop 28 is fixed at 90° and the second stop 32 at 41°. The operator first swings the yoke 141 by means of the handle 142, through two successive arcs of rotation, the first throw of 90° being limited by engagement of the pin 154 with the first stop 28 and the second throw of 41° being limited by holding down the second pin 156 so that its collet 162 will strike the lug 36 of the second stop during the second successive throw of the yoke-arm 151. At the end of the second throw, the indexing-head and work-piece will have been indexed through 90° plus 41°, or a total of 131°. When it is desired to index the work-piece through two successive angles each of less than 90°, then the first and second stops are set at respective points on the scale, the first stop being then engaged by the fixed pin 154 and the second stop by the end 162 of the resiliently mounted pin 160, in two successive throws of the indexing-handle.

On the underside of the flat 146 of the yoke 141, is a pivoted spring-loaded pawl 163 (see Fig. 1) which is normally inoperative but may be released to engage the ratchet-teeth 70 of the indexing-head.

The yoke-member 141 is manually operated by means of the handle 142 which provides a hand-grip 164 at its outer end, and a cam-plate 165 at its inner end having a cam-surface 166. The cam-plate 165 is an integral part of the handle and is supported by spaced parallel bifurcations 167 in a horizontal plane above the horizontal plane of the hand-grip 164. An aperture 168 is provided in the cam-plate 165. The handle is adapted to be assembled on the arm 151 of the yoke by mounting the cam-plate 165 on the flat 146 thereof, the aperture 168 of the cam-plate 165 being engaged over a substantially-vertical post 169 which is integral with or otherwise secured to the tongue 149 of the yoke. The cam-surface 166 is eccentric to the post 169, as shown in Figs. 1 and 4.

Due to the width of the space between the bifurcations 167, which is considerably greater than the width of the arm 151 of the yoke, the handle 142 is enabled to rotate about the post 169 relative to the arm 151. Very slight clockwise rotation of the handle will move the cam-surface 166 thereof toward the adjacent cylindrical wall of the flange 65 of the indexing-head. To control the amount of rotation of the handle with respect to the arm 151 of the yoke, a pair of adjustable screws 170 and 171 are provided, each being mounted in a threaded boss 172 on the outside of the bifurcations 167 respectively. The screw 170 is provided with a spring-loaded plunger 173 adapted to engage the corresponding side of the block 152 of the yoke. The screw 171 embodies a reduced shank-portion 171a which is arranged to engage in a recess 174 in the adjacent side of the block 152 to eliminate unnecessary pivotal movement of the handle and to prevent the latter from being inadvertently lifted up off of the arm 151.

As shown in Figs. 1 and 4, the cam-surface 166 of the handle is adapted normally to make very slight substantially non-binding contact with the outer cylindrical surface of the flange 65 of the indexing-head this normal relationship of the cam-surface 166 to the cylindrical surface of the indexing-head being maintained by the force of the spring-loaded plunger 173 of the handle 164 acting against the adjacent side of the yoke-arm 151. However, when the handle is seized and pulled in a clockwise direction, corresponding to the direction in which the yoke is to be rotated for indexing the work-piece, any slight displacement of the handle with respect to the arm of the yoke will suffice to move the cam-surface 166 into firm binding engagement with the cylindrical wall of the flange 65 and thus "pick-up" the indexing-head and rotate it through an arc corresponding to the throw of the handle. By threading the screw 171 inwardly until its shank 1710 engages the adjacent side of the yoke-arm, relative displacement of the handle with respect to the arm may be eliminated altogether, thus preventing any binding action between the cam-surface 166 and the wall of the indexing-head. Normally, however, the screw 171 is backed out just sufficiently to permit the spring-loaded plunger 173 to hold the cam-surface 166 of the handle in very slight substantially non-binding contact with the indexing-head so that the very minimum of movement of the handle 164 will bring the cam 166 into biting engagement with the indexing-head, thus precluding any possibility of differential movement between the handle and indexing-head when the indexing movement of the latter is initiated.

When the handle 142 is pulled in a direction counted to the direction for indexing a work-piece, the very slight counterclockwise displacement of the handle with respect to the arm 151 of the yoke, releases the cam-surface 166 from biting engagement with the flange 65 of the indexing-head, thereby permitting the yoke to be swung back substantially freely to its original zero position. Since the indexing-head 56 is continuously restrained from rotating by means of the spring-loaded brake-shoes 127 as described above, the indexing-head will remain immobile while the handle and yoke are brought back to their zero position.

*Ejector mechanism*

As pointed out above, the chuck 71 is normally pulled down into the central aperture 64 of the indexing-head 56 by the force of the coil springs 93, this pulling-down of the chuck serving to contract the jaws 81. To open or spread the chuck-jaws 81, the chuck 71 is raised upwardly in the aperture in the indexing-head against the restraining force of the springs 93. To this end, a lever-member is pivotally mounted in the recess 17 in the underside of the base 15 and comprises a yoke-shaped member 175 which, as shown in Fig. 5, consists of one long arm 176 and a short arm 177. The yoke 175 is provided adjacent its throat-end with an apertured enlargement 178 suitably mounted on a shaft 179, the latter in turn being mounted in the left end of the recess 17 transversely to the longitudinal axis. The oval-shaped space between the arms 176 and 177 of the yoke 175 is substantially opposite the central aperture of the indexing-head. At the end of the short arm 177 and on its upper side, is an upturned lug 181 which, as shown in Figs. 2 and 3, is adapted normally to be spaced slightly from the underside of the coupling-ring 82. A similar upstanding lug 182 is formed on the upper side of the long arm 176 in transverse alignment with the lug 181 and is likewise adapted normally to be spaced slightly from the underside of the coupling-ring at a point thereon diametrically opposite the point of contact of the lug 181. The forward reach 183 of the long arm 176 extends, as shown, to the opposite end of the recess 17 and then upwardly through the aperture 48 in the base to a point between the vertical transversely-spaced posts 37 and 38. The extremity of the reach 183 is slotted vertically and provided with a transverse pivot-pin for pivotally securing therein the lower end of a link-member 184. The latter is provided at its upper end (see Fig. 6) with a hook-shaped head 185 which is secured to the threaded shank-portion of the link 184 by an internally-threaded sleeve 185a for longitudinal adjustment thereon, the hook of the head 185 being adapted to engage over a transversely-disposed crank-pin 186 recessed within a vertical slot 187 midway between the opposite ends of the crank-beam 43.

Formed integrally at one end of the crank-beam 43 and adjacent the inside wall of the vertical post 37, is a sector-shaped crank-arm 188 having a laterally-extending pin 189 at one end of the sector adapted normally to engage a fixed stop-pin 190 projecting inwardly from the inside wall of the post 37, the pin 189 being held in engagement with the fixed stop-pin 190 by the weight of the reach 183 of the yoke-member 175, thus rotating the crank-beam 43 in a clockwise direction, as seen in Fig. 2. A chain 191 is shown fastened to the sector-shaped crank-arm 188, and is adapted to be pulled, preferably automatically, to rotate the crank-arm 188 and the crank-beam 43 in a counterclockwise direction against the resisting force of the springs 93 of the indexing-head. Reference to Fig. 1 shows that counterclockwise rotation of the crank-beam 43 carries the link-hook 185 upwardly, thereby raising the reach 183 of the arm 176 and pivoting the yoke 175 about the shaft 179. The lugs 181 and 182 of the arms of the yoke are thus pushed upwardly against the underside of the coupling-ring member 82 and raise the latter in the cylindrical bore 51 of the column 49 by overcoming the resistance of the springs 93. As the locking-lugs 88 of the coupling-member 82 are moved upwardly out of engagement with the corresponding locking-lugs 74 of the chuck, the latter is freed and moves upwardly in the aperture 64 of the indexing-head, due to the inherent resiliency of the compressed jaws 81 which immediately open outwardly to release a work-piece therefrom. The upward movement of the chuck may be further augmented by positive engagement between the beveled surface 91 of the ring 82 and the bevels 77 on the underside of the lugs 74.

Referring again to the crank-beam 43, the latter has formed integrally thereon, adjacent its outer end, a V-shaped element 192 which bears against the outer face of the vertical post 38 and may be provided with an integral shank-portion 193, constituting an extension of the longitudinal axis of the crank-beam 43. As shown, the shank 193 is made hexagonal in cross section and is adapted to accommodate the hexagonally-apertured end of a handle 194 which may be used for manually rotating the crank-beam. In the latter instance, the rotation of the crank-beam is limited by engagement of the pin 189 of the sector 188 against the fixed pin 190 of the post 37. The obliquely-extending arm 195 of the V-shaped element 192 is provided with a vertical slot 196 at its lower end in which a pawl 197 is pivotally secured. The pawl 197 is normally held positively from rotating in a clockwise direction, as seen in Fig. 1, by means of a connector 198 which is pivotally connected at one end by a yoke 199 to the pawl. The opposite end of the connector 198 extends through a counterbored aperture 200 in the lower end of the substantially-vertical arm 201 of the V-shaped element, the connector being threaded at its outer end to receive an adjusting-nut 202. The latter is normally locked in set position by an integral key 203 which is constructed to seat in a keyway 204 formed in the adjacent face of the arm 201. A coil-spring 205 is carried on the connector 198, abuts at one end the yoke 199 and seats at its opposite end in the counterbore 200, thus resisting movement of the pawl in a counterclockwise direction, as seen in Fig. 1. However, by pulling longitudinally on the nut 202 of the connector so as to overcome the force of the spring 205, the key 203 of the nut 202 may be moved out of the keyway 204 and turned relative thereto to raise the pawl slightly and positively lock it in inoperative position. A latch-pin 206 is provided in the lower end of the arm 201 and is spring-loaded in any conventional manner so as to extend forwardly normally away from the adjacent face of the post 38. However, the pin 206 may be pushed inwardly so that its opposite end engages a shoulder 207 of the post 38. This may be done, after the crank-beam 43 has been rotated counterclockwise, to temporarily lock the latter from returning to its normal position. Under these conditions, the force of the springs 83 acting downwardly on the coupling-ring 82 is removed as a consequence of which the chuck 71 is released and may be readily withdrawn from the indexing-head for replacement as, for example, by a chuck having a bore 79 of different diameter. The pin 206 is positively held outwardly in engagement with the shoulder 207 by the shearing force imposed on the pin due to the effort of the crank-beam 43 to return to its normal position.

The aforementioned pawl 197 is provided with a tooth 208 arranged normally to engage the shoulder 209 of a trigger-arm 210, the latter being pivoted at 211 to the base 15 and having an arm 212 extending towards the left-hand end of the machine, as seen in Fig. 2. A spring-loaded plunger 213 of conventional construction is mounted in an aperture in the vertical face 214 of the trigger-arm 210 and is adapted to abut to a fixed-lug 215 on the adjacent face of the post 38 to constantly urge the trigger-arm 212 to rotate about its pivot 211 in a counterclockwise direction. The free end of the trigger-arm 212 is suitably formed so as to extend into the space between the long and short arms 176 and 177 of the yoke-member 175, and is provided at its extremity with an aperture 216 which is normally in axial alignment with the ejector-pin 118, the diameter of the aperture 216 being such as to make a nice fit on the collar 119 at the lower end of the ejector-pin, the thickness of the arm 212 at this point being substantially equal to the height of the collar.

Pivotally mounted on the underside of the trigger-arm 212 adjacent the aperture 216, is a latch-member 217 comprising a finger 218 of suitable length to extend across the aperture 216 and of predetermined thickness corresponding substantially to the length of the stem 120 of the ejector-pin. The finger is thus adapted to make a relatively close fit in the vertical space between the underside of the trigger-arm extremity 212a and the upper edge of the head 121 of the stem 120, thereby effectively locking the ejector-pin 118 to the trigger-arm 212. The finger 218 is normally held in latching engagement with the head 121 of the ejector-pin by a spring-loaded plunger 219. The latter is mounted on the underside of the trigger-arm 212 and is adapted to bear against a manually-operable latch-arm 220 which extends forwardly through a suitable recess 221 in the outer edge of the base 15 for ready engagement by the machine operator. The latch 217 has a second arm 222 which is shorter than the arm 220 and provides a shoulder-portion 223 which is adapted to engage a fixed-pin 224 projecting downwardly from the underside of the trigger-arm to limit the rotation of the latch 217 which, as shown in Fig. 5, is urged by the spring-plunger 219 to rotate in a counterclockwise direction. The extremity of the relatively-short arm 222 is arranged normally to engage on the upper surface of a shelf 225 formed in the base 15, which engagement positively limits the counterclockwise rotation of the trigger-arm 212, as shown clearly in Fig. 2. It will be evident, however, that by engaging and rotating the latch-arm 220 in a counterclockwise direction as seen in Fig. 1, or clockwise as seen in Fig. 5, the finger 218 will be moved out of engagement with the head 121 and stem 120 of the ejector-pin thus unlocking the pin from the trigger-arm 212 and permitting removal thereof from the chuck. Further movement of the latch 217 will move its short arm 222 off of the shelf 225 thereby permitting the trigger-arm to be swung downwardly out of the recess 17 in the base. When swung downwardly, the trigger-arm 212 may be slipped off of the end of the pivot-pin 211. The removal of the trigger-arm is made possible so that in the event the work-piece is relatively long, the central aperture 79 of the chuck will be unobstructed. Moreover, in some instances it is undesirable to provide for the automatic ejection of a work-piece as for example when the work-piece is fragile or a precision-built part, in which case the ejector-pin may be removed, as described above. Normally, however, the ejector-pin is kept in the chuck-aperture 79 since the ejector-pin embodies the function also of a stop-gauge to limit the insertion of the work-piece into the chuck-jaws. In this connection, ejector-pins are provided of different lengths corresponding to the various sizes of work-pieces to be held in the chuck.

The automatic operation of the ejector is effected by the actuation of the trigger-arm 212 which in turn is accomplished each time the crank-beam 43 is rotated in a counterclockwise direction, as described above. This counterclockwise rotation of the crank-beam 43 carries the pawl-tooth 208 up against the shoulder 209 of the trigger-arm thereby pivoting the trigger-arm clockwise, as seen in Fig. 2, and swinging the inner end 212a thereof upwardly beneath the central aperture of the indexing-head. The upward movement of the inner end of the trigger-arm 212 automatically lifts the ejector-pin 118 causing the upper end thereof to drive a work-piece upwardly out of the chuck-jaws, the latter having already released the work-piece immediately preceding the operation of the ejector. As soon as the pawl-tooth 208 clears the upper edge of the shoulder 209, the trigger-arm 212 is returned to its normal position by the force of the spring-loaded plunger 213 acting thereon, the ejector-pin being thereupon pulled down by the arm 212 to its normal position in the chuck. When the crank-beam 43 is released by the chain 191, the beam 43 rotates clockwise to its normal position and the pawl-tooth 208 rides back over the shoulder 209 of the trigger-arm, contact between the pawl-tooth and the shoulder being relieved by a slight compression of the spring 205 of the pawl-connector 198. As pointed out above, by turning the nut 202 out of its keyway 204, the pawl-tooth 208 will be displaced so that it will not engage the shoulder 209 of the trigger-arm 212. As a consequence, the trigger-arm 212 will be rendered inoperative thus preventing actuation of the ejector even though the latter remains in the chuck.

The assembly of the chuck 71, coupling-ring 82, spring-bushing 95 and indexing-head 56 is believed to be clear from the foregoing description and briefly is as follows: the coupling-ring 82, together with the coil-springs 93 and the spring-bushing 95 mounted thereon, are inserted upwardly into the bore 51 of the column 49 from the lower end thereof until the bearing-surface 99 of the spring-bushing engages the underside of the annular flange 52 of the column 49. The indexing-head 56 is then mounted on the upper end of the spring-bushing 95 and is adapted to be keyed thereto by a pair of pins 226 which extend through the registering semicylindrical grooves 101 and 1010 of the spring-bushing and indexing-head respectively. The coupling-ring 82 is then held from dropping out of the bore of the column by mounting the yoke-member 175 in the recess 17 in the underside of the base so that the lugs 181 and 182 of the yoke will bear upwardly against the underside of the coupling-ring 82.

The chuck 71 may then be inserted into the central aperture 64 of the indexing-head and lowered downwardly therein, the locking-lugs 74 being arranged in alignment with the diametrically-opposite relief-recesses 89 in the upper edge of the coupling-ring 82 until the locking-lugs 74 of the chuck are below the locking-lugs 88 of the ring. Then by turning the chuck through substantially 90°, the locking-lugs 74 thereof will engage beneath the corresponding locking-lugs 88 of the coupling-ring whereby the chuck is locked thereto. Consequently, downward displacement of the coupling-ring 82 will pull the chuck 71 down into the tapered aperture 64 of the indexing-head to effectively close the chuck-jaws 81. The spring-loaded key 104 may then be engaged in the slot 107 in the head of the chuck to prevent its rotation relative to the indexing-head.

The fixture is adapted to be mounted securely on the horizontal reciprocating carriage of a machine, such as a milling machine, the crank-beam operating-chain 191 being fastened securely at its free end to a part of the machine frame. Each time the fixture is moved away from the tool, the chain will be tightened and operate the crank-beam so that the chuck-jaws 81 will be opened to receive a work-piece, the jaws 81 being subsequently closed to tightly grip the work-piece as soon as slack is permitted in the chain. Having set the adjustable stops 28 and 36 for the prescribed index angle, the operator then grasps the handle 142 of the indexing-head and pulls it in a clockwise direction. Immediately the cam-surface 166 of the handle takes hold on the adjacent surface of the indexing-head to carry the head around through an arc corresponding to the index angle. The operator then reverses the direction of rotation of the handle whereupon the cam-surface 166 disengages the indexing-head, the latter remaining motionless due to the restraining influence of the brake-shoes, while the handle is returned to its original zero position. After the work-piece has been milled on one face, the operator again swings the handle as before picking up the indexing-head and indexing the work-piece through the predetermined index angle, and again the handle is returned to its original position. These successive operations are continued until the machining operation on the work-piece has been completed.

If the work-piece is one which may be removed from the chuck by automatic ejection, then as the chain 191 is automatically tightened, the crank-beam 43 rotates counterclockwise thereby elevating the coupling-ring member 82 and releasing the chuck. The latter moves upwardly in the central aperture 64 of the indexing-head whereupon the chuck-jaws spread apart and release the work-piece. Immediately thereafter, the pawl 197 of the crank-beam 43 trips the trigger-arm 212 which drives the ejector-pin 118 upwardly in the chuck causing the work-piece to be ejected therefrom. As soon as the finished work-piece has been ejected, a second work-piece may be dropped into the open jaws of the chuck, the ejector having been pulled downwardly therein to its normal position by the trigger-arm 212.

Should it be undesirable to automatically eject the finished work-piece, then the ejector may be readily disconnected from its actuating-means, as described above. Further, when unusually long work-pieces are to be machined, the ejector may be entirely removed and the base 15 of the indexing-fixture secured to a substantially-vertical support or angle-plate of the machine to permit the work-piece to extend outwardly horizontally through the bottom of the fixture. It will be noted that by providing the indexing-scale wholly on one side of he base, the center of the indexing-head is closer to one side of the base than the other, which means that the center of the chuck may be located at a minimum distance from the machine tool.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a work-piece chucking-device having a work-piece indexing-head and a chuck in said indexing-head for holding a work-piece; indexing-means for actuating said indexing-head comprising an indexing-arm having an eccentric face at one end thereof; an indexing-arm supporting-member comprising a yoke having a pair of arcuate diverging-arms supported on said indexing-head in engagement with the periphery thereof and movable relative thereto; and means pivotally mounting said indexing-arm on said yoke to hold the said eccentric face of said indexing-arm in operative relationship with the periphery of said indexing-head whereby pivotal movement of said indexing-arm relative to said yoke moves said eccentric face into frictional engagement with the periphery of said indexing-head for rotating the latter in the direction of movement of said indexing-arm.

2. In a work-piece chucking-device having a work-piece indexing-head and a chuck in said indexing-head for holding a work-piece: indexing-means for actuating said indexing-head comprising an indexing-arm having an eccentric face at one end thereof; an indexing-arm supporting-member comprising a yoke having a pair of arcuate diverging-arms supported on said indexing-head in engagement with the periphery thereof and movable relative thereto; means pivotally mounting said indexing-arm on said yoke to hold the said eccentric face of said indexing-arm in operative relationship with the periphery of said indexing-head; and a key carried by said yoke arranged to couple said yoke to said indexing-head with the arms of said yoke movably embracing the periphery thereof whereby pivotal movement of said indexing-arm relative to said supporting-member moves said eccentric face into frictional engagement with the periphery of said indexing-head for rotating the latter in the direction of movement of said indexing-arm.

3. In a work-piece chucking-device having a work-piece indexing-head provided with an annular groove in the periphery thereof, an annular channeled flange, and a chuck in said indexing-head for holding a work-piece: indexing-means for actuating said indexing-head comprising an indexing-arm having an eccentric face at one end thereof; an indexing-arm supporting-member comprising a yoke having a pair of arcuate diverging-arms supported in the annular groove of said indexing-head in engagement with the periphery thereof and movable relative thereto; means pivotally mounting said indexing-arm on said yoke to hold the said eccentric face of said indexing-arm in operative relationship with the periphery of said indexing-head; and a key carried by said yoke arranged to engage in the annular channeled flange of said indexing-head to couple said yoke thereto with the arms of said yoke movably embracing the periphery thereof whereby pivotal movement of said indexing-arm relative to said supporting-member moves said eccentric face into frictional engagement with the periphery of said indexing-head for rotating the latter in the direction of movement of said indexing-arm.

4. In a work-piece chucking-device having a work-piece indexing-head provided with an annular groove in the periphery thereof, an annular channeled flange, and a chuck in said indexing-head for holding a work-piece: indexing-means for actuating said indexing-head comprising an indexing-arm having an eccentric face at one end thereof; an indexing-arm supporting-member comprising a yoke having a pair of arcuate diverging-arms supported in the annular groove of said indexing-head in engagement with the periphery thereof and movable relative thereto; means pivotally mounting said indexing-arm on said yoke to hold the said eccentric face of said indexing-arm in operative relationship with the periphery of said indexing-head; a key carried by said yoke arranged to engage in the annular channeled flange of said indexing-head to couple said yoke thereto with the arms of said yoke movably embracing the periphery thereof whereby pivotal movement of said indexing-arm relative to said supporting-member moves said eccentric face into frictional engagement with the periphery of said indexing-head for rotating the latter in the direction of movement of said indexing-arm; an adjustable means carried by said indexing-arm arranged to cooperatively engage said yoke to limit the pivotal movement of said indexing-arm relative thereto; and a second adjustable means carried by said indexing-arm embodying a resilient member arranged to engage said yoke to return said indexing-arm to its normal position with respect thereto following pivotal movement of said arm relative to said yoke.

5. In a work-piece chucking-device having a work-piece indexing-head and a chuck in said indexing-head for holding a work-piece: indexing-means for actuating said indexing-head comprising an indexing-arm having an eccentric face at one end thereof; an indexing-arm supporting-member carried by the said indexing-head; means pivotally mounting said indexing-arm on said supporting-member to hold the said eccentric face of said indexing-arm in operative relationship with said indexing-head whereby pivotal movement of said indexing-arm relative to said supporting-member moves said eccentric face into frictional engagement with said indexing-head for rotating the latter in the direction of movement of said indexing-arm; and brake-means for said indexing-head comprising a brake-shoe supported adjacent the periphery of said indexing-head and a spring-loaded lever-arm arranged to engage said brake-shoe to hold the latter firmly in engagement with the periphery of said indexing-head whereby the latter is frictionally held against rotation except when rotated by said indexing-arm.

6. In a work-piece chucking-device having a work-piece indexing-head and a chuck in said indexing-head for holding a work-piece: indexing-means for actuating said indexing-head comprising an indexing-arm having an eccentric face at one end thereof; an indexing-arm supporting-member carried by the said indexing-head; means pivotally mounting said indexing-arm on said supporting-member to hold the said eccentric face of said indexing-arm in operative relationship with said indexing-head whereby pivotal movement of said indexing-arm relative to said supporting-member moves said eccentric face into frictional engagement with said indexing-head for rotating the latter in the direction of movement of said indexing-arm; and brake-means for said indexing-head comprising a pair of brake-shoes pivotally mounted on substantially opposite sides respectively of said indexing-head adjacent the periphery thereof and a pair of spring-loaded lever arms arranged to engage said brake-shoes respectively in engagement with the periphery of said indexing-head whereby the latter is frictionally held against rotation except when rotated by said indexing-arm.

7. In a device for indexing a work-piece: a base having a lip on the underside thereof; an indexible-head on said base; a chuck supported in said head for gripping a work-piece; means for indexing said head; a work-piece ejector mounted in said chuck; ejector-actuating means; pivotal-means on said base arranged to support said ejector-actuating means on the underside of said base for pivotal movement relative thereto in a substantially-vertical plane; and manually-operable latch-means carried by said ejector-actuating means, said manually-operable latch-means being arranged normally to engage said ejector to connect the latter to said ejector-actuating means for operation thereby and concurrently to cooperate with the lip of said base to hold said ejector-actuating means from swinging down below the substantially-horizontal plane of said base.

8. In a device for indexing a work-piece: a base having a lip on the underside thereof; an indexible-head on said base; a chuck supported in said head for gripping a work-piece; means for indexing said head; a work-piece ejector mounted in said chuck; ejector-actuating means; pivotal-means on said base arranged to support said ejector-actuating means on the underside of said base for pivotal movement relative thereto in a substantially-vertical plane, said ejector-actuating means having an apertured portion arranged to accommodate the lower end of said ejector; manually-operable latch-means; pivotal-means arranged to secure said manually-operable latch-means to the apertured portion of said ejector-actuating means for pivotal movement in the horizontal plane thereof to and from engagement with the lower end of said ejector, thereby to connect said ejector to said ejector-actuating means for operation thereby and to disconnect said ejector from said ejector-actuating means; and a finger projecting from said manually-operable latch-means, said finger being arranged normally to cooperatively engage with the lip of said base to hold said pivoted ejector-actuating means from swinging down below the substantially-horizontal plane of said base, and to automatically disengage said lip upon unlatching said ejector from said ejector-actuating means to permit said pivoted ejector-actuating means to swing downwardly below the horizontal plane of said base.

JOHN W. DEARBORN.

REFERENCES CITED

The following references are of record in the file of this patent:

UNITED STATES PATENTS

| Number | Name | Date |
|---|---|---|
| 1,426,552 | Cross | Aug. 22, 1922 |
| 1,879,656 | Brown | Sept. 27, 1932 |
| 2,186,236 | Dearborn | Jan. 9, 1940 |
| 2,342,539 | Gorton | Feb. 22, 1944 |
| 2,424,448 | Gardner | July 22, 1947 |